US012637172B2

(12) United States Patent
Deleval

(10) Patent No.: US 12,637,172 B2
(45) Date of Patent: *May 26, 2026

(54) ELECTRICALLY-ASSISTED VEHICLE PROPULSION SYSTEM

(71) Applicant: E2 DRIVES, Genval (BE)

(72) Inventor: Arthur Deleval, Overijse (BE)

(73) Assignee: E2 DRIVES, Genval (BE)

( * ) Notice: Subject to any disclaimer, the term of this patent is extended or adjusted under 35 U.S.C. 154(b) by 945 days.

This patent is subject to a terminal disclaimer.

(21) Appl. No.: 17/634,754

(22) PCT Filed: Aug. 12, 2020

(86) PCT No.: PCT/EP2020/072563
§ 371 (c)(1),
(2) Date: Feb. 11, 2022

(87) PCT Pub. No.: WO2021/032548
PCT Pub. Date: Feb. 25, 2021

(65) Prior Publication Data
US 2022/0274670 A1     Sep. 1, 2022

(30) Foreign Application Priority Data
Aug. 16, 2019    (BE) .................................. 2019/5533

(51) Int. Cl.
*B62M 6/55*        (2010.01)
*B62K 19/34*       (2006.01)
(Continued)

(52) U.S. Cl.
CPC .............. *B62M 6/55* (2013.01); *B62K 19/44* (2013.01); *B62M 11/145* (2013.01); *B62K 19/34* (2013.01); *B62M 9/02* (2013.01)

(58) Field of Classification Search
CPC ...... B62K 19/34; B62K 19/44; B62K 25/005; B62M 6/40; B62M 6/55; B62M 9/02; B62M 11/145
USPC ....................................................... 280/238
See application file for complete search history.

(56) References Cited

U.S. PATENT DOCUMENTS 4,936,597 A * 6/1990 Hartmann ............ B62M 11/145
                                                280/238
5,845,727 A    12/1998 Miyazawa et al.
(Continued)

FOREIGN PATENT DOCUMENTS

BE         1026017 A1    9/2019
BE         1026057 A1    9/2019
(Continued)

*Primary Examiner* — Valentin Neacsu
*Assistant Examiner* — Felicia L. Brittman-Alabi
(74) *Attorney, Agent, or Firm* — Dickinson Wright PLLC

(57) ABSTRACT

The invention relates to a propulsion system (1) for a pedal vehicle. The propulsion system (1) comprises a power unit (1) allowing the power originating from a bottom-bracket axle (2) to be combined with the power from two motors (40, 50), a first deformable transmission element (23) allowing the transmission of power to the rear wheel (73) and a casing assembly (19) enclosing particularly the first deformable transmission element (23) and the power unit (1), with the exception of part of the bottom-bracket axle (2).

18 Claims, 5 Drawing Sheets

(51) Int. Cl.
    *B62K 19/44*         (2006.01)
    *B62M 9/02*          (2006.01)
    *B62M 11/14*        (2006.01)

(56)             References Cited

U.S. PATENT DOCUMENTS

| | | | |
|---|---|---|---|
| 9,676,442 B1 * | 6/2017 | Li | ............................. B62M 6/25 |
| 11,091,225 B2 * | 8/2021 | Deleval | .................... B62M 6/55 |
| 2015/0122565 A1 | 5/2015 | Deleval | |
| 2017/0217538 A1 * | 8/2017 | Yamamoto | ........... B62M 11/145 |
| 2017/0259883 A1 * | 9/2017 | Yamamoto | .............. F16H 3/724 |
| 2020/0407016 A1 | 12/2020 | Deleval | |
| 2021/0046998 A1 | 2/2021 | Deleval | |

FOREIGN PATENT DOCUMENTS

| | | | |
|---|---|---|---|
| CN | 1153499 | A | 7/1997 |
| CN | 104520179 | A | 4/2015 |
| CN | 204527510 | U | 8/2015 |
| CN | 105324299 | A | 2/2016 |
| CN | 107107988 | A | 8/2017 |
| TW | 201615481 | A | 5/2016 |
| WO | 2013160477 | A1 | 10/2013 |
| WO | 2014172422 | A1 | 10/2014 |
| WO | 2016034574 | A1 | 3/2016 |
| WO | 2016067199 | A1 | 5/2016 |
| WO | 2019043123 | A1 | 3/2019 |
| WO | 2019158503 | | 8/2019 |
| WO | 2019158503 | A1 | 8/2019 |
| WO | 2019166402 | A1 | 9/2019 |

* cited by examiner

ELECTRICALLY-ASSISTED VEHICLE PROPULSION SYSTEM

CROSS-REFERENCE TO RELATED APPLICATIONS

This is a US national stage application of PCT International Application No. PCT/EP2020/072563 filed on Aug. 12, 2020, which claims priority from BE2019/5533, filed Aug. 16, 2019, the contents of which (including all attachments filed therewith) are hereby incorporated by reference in their entirety.

TECHNICAL FIELD

The present invention relates to a propulsion system for a pedal vehicle, in particular for an electric bicycle or bike. The propulsion system comprises a powertrain and a transmission system to transfer power to the rear wheel of the vehicle.

BACKGROUND

The document WO2019043123 describes a powertrain for a bicycle. This powertrain comprises an epicyclic gear train, a crankset axle, an output plate, a first motor and a second motor. The epicyclic gear train comprises a ring gear, a sun and a planet carrier.

In this powertrain, a reduction stage is present between the output of the planetary gear train and the output plate of the powertrain. This reduction stage generates transmission losses. It also adds weight and overall dimension to the powertrain. In addition, in this powertrain, the power is transmitted from the output plate to the rear wheel sprocket through an apparent chain or belt. This chain or belt is exposed to dirt which reduces the service life of the transmission and increases its maintenance. Moreover, the passage of this chain or belt near the leg of the cyclist can be dirty and/or dangerous.

SUMMARY OF THE INVENTION

One of the aims of the invention is to provide a propulsion system for a pedal vehicle, integrating a powertrain and the transmission system to the rear wheel, which is simple to manufacture, offers an excellent level of safety, is light, robust, has a small overall dimension and is particularly efficient.

To this end, the invention proposes, a propulsion system for a pedal vehicle and comprising:
- a first deformable transmission element arranged to drive a rear wheel of the pedal vehicle;
- a powertrain comprising:
  - a crankset axle arranged so as to rotate about a first axis of rotation,
  - a main output plate arranged to drive the first deformable transmission element,
  - a first motor,
  - a second motor,
  - an epicyclic gear train comprising a first input element, an output element and a sun,
  - the crankset axle and the second motor being connected to the epicyclic gear train via the first input element so as to form a first input of the epicyclic gear train,
  - the first motor being connected to the epicyclic gear train via the sun so as to form a second input of the epicyclic gear train, the output element connecting the epicyclic gear train to the main output plate so as to form an output of the epicyclic gear train, and
the first deformable transmission element being arranged to transmit power between the powertrain and the rear wheel of the pedal vehicle;
a casing assembly;
a rear sprocket (24); characterised in that
the main output plate, the first input element, the output element and the sun are arranged so as to rotate about a same second axis of rotation different from the first axis of rotation;
the powertrain comprises:
  a secondary output plate arranged to rotate about the first axis of rotation and meshed to the first deformable transmission element,
  a speed reduction system maintaining the direction of rotation for transmitting a rotation between the crankset axle and the first input element; and
the first deformable transmission element, a portion of the crankset axle, the main output plate, the first motor, the second motor, the epicyclic gear train, the secondary output plate, and the rear sprocket are within the casing assembly.

In the powertrain according to the invention, the main output plate, the first input element, the output element and the sun have an axis of rotation spatially offset from the axis of rotation of the axle of the crankset. This allows the size of the sun to be independent of the diameter of the axle of the crankset. This allows to install a smaller diameter sun and thus increase the ration for the epicyclic gear train. It is therefore possible to obtain a sufficient ratio for the epicyclic gear train without using double planet gears. This allows the powertrain to be easier to manufacture, easier to assemble and cheaper.

The powertrain according to the invention also allows to provide a large reduction ratio between the first motor and the output plate. This reduction ratio depends on the ratio for the epicyclic gear train, the gear ratio between the crankset axle and the first input of the epicyclic gear train and the ratio of the number of teeth between the secondary and main output plate.

The casing assembly protecting the first deformable transmission element in the vicinity of the right-hand crank allows to prevent the passage of the latter between the main output plate and the secondary output plate from hitting the leg of the cyclist or its clothing. It also allows to hide the two output plates, which are unconventional on bicycles and may disturb the user. In addition, since the casing assembly encloses the transmission from the crankset to the rear wheel, it allows to provide a particularly high level of safety and cleanliness.

A casing assembly enclosing the first deformable transmission element, such as that of the invention, would not be possible with a vehicle comprising a derailleur. A derailleur creates large vertical displacements of the first deformable transmission element, which are incompatible with a reasonably sized casing assembly. Therefore, the powertrain according to the invention, which allows to shift the gears without the use of derailleur, is particularly suitable for the casing assembly according to the invention.

The casing assembly surrounds the elements ensuring the torque transmission from the main output plate and/or the secondary output plate to the rear wheel sprocket, which in turn drives the rear wheel. For example, the main output plate, the secondary output plate, the rear wheel sprocket, and the transmission chain or the belt are enclosed in a first casing, which forms a casing assembly with one or more other casings surrounding the powertrain.

The enclosure of the propulsion system, in particular of the output plates and the first deformable transmission element, offers a double advantage. Firstly, it allows to protect the parts inside the casing assembly from dirt and moisture, significantly increasing the service life of the transmission and reducing or completely eliminating maintenance. In the case of a transmission chain, this allows to keep the grease inside to keep the lubrication of the chain. Secondly, it allows to protect the cyclist from injury or stain caused by contact with a part of the transmission.

Another advantage is that the propulsion system is grouped in a single case that can be removed from the rest of the vehicle. This assembly includes most of the technical part, and therefore most of the value of the electric vehicle. In case of failure, it can be easily removed and replaced by a new one.

"Casing assembly" forms an envelope of the propulsion system. It preferably comprises several casings, in particular the transmission casing which encloses the first deformable transmission element and the motor casing which encloses the powertrain. The transmission casing may comprise several casings. The motor casing may comprise several casings. The transmission casing may comprise a case and a cover closing the case. The case is preferably located between the rear wheel and the cover.

The casings comprised in the casing assembly are preferably moulded from a light alloy (aluminium or magnesium for example) and are assembled, for example, using screws. The casing assembly allows the various rotation axes to be guided, in particular the crankset axle, the axles of the two motors and the rear wheel axle. The casing assembly ensures also the sealing of the system. The casing assembly comprises openings, in particular one or two openings for passing the crankset axle and two openings for passing the rear wheel axle.

Since the axle of the crankset is different from the axle of the first input element, there is a first gear reduction between the crankset and the first input element. This allows to reduce the torque in the epicyclic gear train while increasing its speed of rotation. As a result, the strength requirements of the epicyclic gear train are reduced and a lighter epicyclic gear train is possible. In addition, the faster rotation of the elements of the epicyclic gear train allows it to be compatible with smaller motors, which typically run faster and with less torque than larger motors.

The secondary output plate can also transmit some power if the instantaneous torque on the crankset exceeds a certain threshold and the first motor saturates at its maximum torque. During the duration of this thrust on the pedal, the instantaneous value of the gear ratio of the powertrain decreases, and for example if the programmed gear ratio is low, the first freewheel may engage and drive the secondary output plate which then transmits the excess torque of the cyclist to the first deformable transmission element. When this occurs, which may happen when the power assist is activated, the first deformable transmission element receives power on the one hand via the epicyclic gear train and the main output plate and on the other hand via the secondary output plate. The presence of the secondary output plate and the first freewheel thus prevents the gear ratio of the powertrain from being less than one.

In particular, the propulsion system described in the present document is in particular provided so that the powertrain is as described in the document PCT/EP2019/053386.

In the context of the present document, a deformable transmission element may be, in particular, a chain, a belt or a flexible band. If it is a belt, it is preferably made of a flexible material and is preferably toothed or serrated on its inner surface.

It is interesting to note that the powertrain has a mode of operation, which can be referred to as "normal operating mode", in which the entire power, which is equivalent to the sum of the power of the two motors and the power of the cyclist, is supplied to the main output plate. This main output plate transmits power via the first deformable transmission element to the rear wheel. This is the operating mode most often used by the cyclists using an electric bicycle.

In the powertrain according to the invention, a transmission by means of a speed reduction system maintaining the direction of rotation existing between the crankset axle and the first input of the epicyclic gear train. This speed reduction system allows for a reduction in angular speed, which is particularly interesting because the speed of the crankset is much lower than that of an electric motor.

In the context of the present document, the normal direction of pedalling is the direction of rotation of the axle of the crankset which corresponds to a forward motion of the pedal vehicle.

In the context of the present document, an "output plate" is an output plate of the powertrain and which is provided to drive the first deformable transmission element.

The various characteristics of the powertrain according to the invention allow its elements to have particularly large mechanical reduction/multiplication ratios while maintaining a relatively small number of transmission stages. As a result, the powertrain provides an excellent efficiency while keeping a low size and weight.

A low number of transmission stages allows to optimize the transmission efficiency. In addition, this allows for less transmission clearance between the elements of the powertrain, which can improve the accuracy of the control of the powertrain. This control accuracy is in particular particularly useful if the first motor is controlled in speed based on the speed of the second motor.

An advantage of the powertrain is that it allows a gear reduction to be placed between the axle of the crankset and the first input element of the epicyclic gear train. All the elements of the epicyclic gear train therefore turn faster and with less torque. This reduces the mechanical stresses on them. A further advantage of the powertrain according to the invention is that it provides a continuously variable transmission ratio.

Preferably, the powertrain comprises a control unit allowing to control the first and the second motors.

The fact that the axle of the crankset and the secondary output plate have the same axis of rotation allows the crankset axle to be out of the way of the first deformable transmission element that allows to connect the main output plate to the rear wheel.

In the context of the present document, two connected or related elements may be connected or related directly or indirectly. They may, for example, be directly or indirectly meshed via at least one intermediate toothed wheel, a belt and/or a roller.

In the context of the present document, the terms "input" and "output" are to be understood in the sense of an input and an output in a kinematic chain. An input is preferably a mechanical power input and an output is preferably a mechanical power output.

In the context of the present document, a pedal vehicle may be, for example, a bicycle, a moped, a tricycle.

In the context of the present document, "the powertrain gear ratio" is defined as the ratio between the speed of the secondary output plate and the speed of the axle of the crankset. It can also be referred to as "gear ratio parameter". This is a parameter that can be controlled manually by the cyclist via a control interface or calculated automatically by the control unit based on other parameters.

In the context of the present document, an element "arranged to rotate about an axis of rotation" is preferably an element that is substantially symmetrical about that axis.

In the context of the present document, a "fixed ratio" between two objects means that their rotational speeds are in a constant ratio.

In the context of the present document, the "assistance level of the powertrain" refers to the segment of the power given by the electric assist relative to the power given by the cyclist. It can be calculated as the power of the assembly of the two motors divided by the sum of the power of the assembly of the two motors and of the power of the cyclist. It can also be referred to as "assistance level parameter". This is a parameter that can be controlled manually by the cyclist via a control interface or calculated automatically by the control unit based on other parameters.

In the context of the present document, an angular position measurement is equivalent to an angular speed measurement. Indeed, the powertrain according to the invention preferably comprises a means for determining the angular speed of one of the motors from the angular position of this motor.

In the context of the present document, a current measurement is equivalent to a torque measurement. Indeed, the powertrain according to the invention preferably comprises a means for determining the torque of one of the motors from the current supplied to that motor.

The epicyclic gear train comprises a ring gear, a planet carrier and a sun.

The transmission between the axle of the crankset and the first input element is via a transmission mechanism such that the first input element rotates in the same direction as the crankset axle.

Preferably, the main output plate and the secondary output plate are connected to the rear wheel of the pedal vehicle by means of an output transmission chain or an output transmission belt.

The rotation of the axle of the crankset comes from the pedalling motion of a cyclist using the pedal vehicle. The use of an epicyclic gear train with the axle of the crankset as input allows a change in the gear ratio between the rotation of the crankset axle and the rotation of the main output plate, as well as the rotation of the secondary output plate.

Preferably, the control of the motors is a feedback control.

The powertrain according to the invention can operate as a back-pedal brake, which allows to recover the braking energy to recharge the battery. Preferably, the powertrain is then arranged so that the rear wheel is capable of driving the first deformable transmission element to transmit the motion to the main output plate. This can be done, for example, by mounting the sprocket of the rear wheel secured on a hub of the rear wheel. Therefore, if the pedal vehicle descends a slope, the first deformable transmission element rotates by driving the main output plate. This will result in rotating the first motor and/or the second motor. It is sufficient to apply a negative torque instruction to the first and/or the second motor in order to brake the vehicle and recover some of the energy to recharge the battery. This motor brake can be controlled in several ways. This motor brake could for example be operated by the cyclist via a control on the handlebar, via the brake lever or the brake levers or via the back-pedalling of the cranks.

In an embodiment of the invention, the propulsion system further comprises a tensioning roller arranged to tension the first deformable transmission element, and which is preferably located within the casing assembly.

In one embodiment of the invention, the casing assembly comprises a transmission casing which encloses the first deformable transmission element, the transmission casing being arranged to be located on one side of the rear wheel only.

Thus, the casing assembly comprises a single-arm. In particular, the transmission casing can form a single-arm. The single-arm is preferably located on the right side of the wheel. The single-arm allows the tire to be removed from the bike (in case of a puncture), without removing the rear wheel. Preferably, the single-arm is composed of two moulded portions made of a light alloy (e.g. aluminium or magnesium alloy) which are assembled by means of attachment screws. The moulding allows to produce thin-walled and ribbed hulls to obtain a strong and light single-arm. This also allows to reduce the cost of large-scale manufacturing. Another advantage of the moulding is that it allows many functions to be integrated in the same mould, such as attachment points for a braking system, a kickstand, a mudguard, a luggage carrier, or a trailer hitch.

The single-arm can be attached in a stationary manner to the frame of the bicycle, for example, or by means of a shock absorber. It can be connected via a pivot to the frame, in particular if it is attached to the frame by means of a shock absorber.

In an embodiment of the invention, the casing assembly is arranged to ensure alone the mechanical attachment between the rear wheel and a frame of the pedal vehicle.

In particular, the transmission casing is preferably arranged to ensure alone the mechanical attachment between the rear wheel and a frame of the pedal vehicle.

In other words, the transmission casing is self-supporting in the sense that it alone allows to ensure the mechanical coupling between the rear wheel and the frame of the pedal vehicle. Thus, the transmission casing forms the rear structure of the vehicle, guiding in particular the rear wheel axle. This has the advantage of reducing the size of the frame of the vehicle.

In an embodiment of the invention, the second motor is connected to the first input element of the epicyclic gear train via a third deformable transmission element, preferably a serrated belt.

This third deformable transmission element preferably forms the whole of this mechanical connection. This allows only one reduction stage to be used, and the direction of rotation between the axle of the second motor and the first input element to be maintained. This allows to reduce the transmission clearance, improving the quality of the speed control of the first motor. This also allows to increase the centre distance between the axle of the second motor and the axle of the first motor without changing the reduction ratio and without increasing the radial dimension of the transmission elements, and thus allow to have more space for installing the second motor side by side with the first motor.

In an embodiment of the invention, the propulsion system further comprises a rear sensor arranged to measure the speed of the rear wheel and located within the casing assembly. Preferably, the rear sensor is arranged to detect a passage of an element arranged to rotate with the rear wheel.

This sensor is used to measure the speed of the bike when the crankset is stopped and that the bike is free-wheeling. Preferably, a sensor equipped with a magnet and a Hall effect sensor is used to detect the passage of the ferromagnetic branches of the brake disc, thus increasing the robustness of the system as well as the passband of the signal. Indeed, this solution avoids placing a magnet on a rotating portion of the wheel.

In an embodiment of the invention, the main output plate is integral with the output element. The attachment of the main output plate to the output element allows the output of the epicyclic gear train to drive the main output plate without reduction of speed.

This allows an assembling of the powertrain particularly easy, and makes it particularly light and space-saving. In addition, this allows to result in a particularly high efficiency.

In an embodiment of the invention, the propulsion system further comprises a first freewheel arranged to prevent the secondary output plate from rotating slower than the crankset axle when the crankset axle rotates in the normal pedalling direction.

The first freewheel is preferably located inside the casing assembly. The first freewheel is arranged to allow a mechanical power transmission from the crankset axle to the secondary output plate. The first freewheel is arranged, preferably directly, between the crankset axle and the secondary output plate. In the locked position, the crankset axle drives the secondary output plate directly. In the free position, the secondary output plate can turn faster than the crankset axle. This position of the freewheel allows to achieve a particularly low first gear ratio of the powertrain.

In addition, the first freewheel allows that, under certain conditions, the crankset axle directly drives the secondary output plate, which itself drives the first deformable transmission element that drives the rear wheel. All of the power of the pedalling is then transmitted directly to the first deformable transmission element via the secondary output plate. The rest of the propulsion system, including the epicyclic gear train, is therefore not loaded, which allows a high mechanical efficiency. This happens, for example, if the electrical system of the powertrain is switched off or if the assistance is deactivated and the lowest gear ratio of the powertrain is selected.

In an embodiment of the invention, the powertrain further comprises a second freewheel arranged to prevent a drive of the crankset axle by the second motor in a rotational direction corresponding to a forward motion of the pedal vehicle.

In an embodiment of the invention, the powertrain further comprises a rear wheel freewheel arranged to prevent the rear sprocket from rotating faster than the rear wheel when the crankset axle rotates in the normal pedalling direction which corresponds to a forward motion of the pedal vehicle.

In one embodiment of the invention, the main output plate is smaller than the secondary output plate.

In one embodiment of the invention, the rear sprocket is smaller than the secondary output plate and larger than the main output plate.

In a first embodiment of the invention, the first input element is a ring gear of the epicyclic gear train and the output element is a planet carrier of the epicyclic gear train.

According to a preferred example of this embodiment, the axle of the crankset is connected, with a fixed ratio, to the ring gear; the rotor of the second motor is connected, with a fixed ratio, to the ring gear; the rotor of the first motor is connected, with a fixed ratio, to the sun; the ring gear forms the first input of the epicyclic gear train and the sun forms the second input of the epicyclic gear train; the planet carrier forms an output of the epicyclic gear train; the planet carrier is integral with the main output plate. More preferably, the rotor of the first motor is integral with the sun.

In a second embodiment of the invention, the first input element is a planet carrier of the epicyclic gear train and the output element is a ring gear of the epicyclic gear train.

In a second embodiment of the invention, the crankset axle and the first input element are connected such that the first input element rotates faster than the crankset axle.

Preferably, the speed reduction system maintaining the direction of rotation comprises a second deformable transmission element, for example a chain or a belt. The use of a second deformable transmission element also allows to reduce the transmission clearances compared to the use of gears.

In addition, the use of a second deformable transmission element to reduce the speed of the axle of the crankset to the first input of the epicyclic gear train allows to obtain a particularly large distance between the crankset axle and the axle of the epicyclic gear train. This allows to increase the size of the ring gear of the epicyclic gear train to increase its ratio. The purpose of increasing the ratio of the epicyclic gear train and increasing the speed of the two electric motors and thus reducing the size of these motors. This reduces the weight and the volume of the powertrain. In this way, it is possible to reduce the diameter of the two electric motors, allowing both to be positioned on the same side of the powertrain. The second deformable transmission element allows to isolate the crankset from vibrations that may come from the electric motors or from the transmission. It dampens the vibrations felt by the cyclist in the feet, thus improving its comfort.

Preferably, the first motor is integral with the sun. Preferably, the first motor and the second motor are located on a same side of the epicyclic gear train. This design allows to reduce the volume of the powertrain and to facilitate the assembling because both motors are close to a same electronic board to which they can both be connected. Preferably, the motors are located on the side of the powertrain opposite to that of the output plates.

Preferably, the powertrain further comprises:

an angular position measuring element of the first motor, an angular position measuring element of the second motor, a current measuring element of the first motor, a current measuring element of the second motor, a control unit connected to the first motor, to the second motor, and arranged to control the first motor and the second motor based on the angular position of the first motor, the angular position of the second motor, the current of the first motor, and the current of the second motor, the control unit being arranged to control the second motor according to a current or torque control and to control the first motor according to angular position or angular speed control.

Preferably, the role of the first motor is to manage the gear ratio of the powertrain. One of its functions is to offer a given transmission ratio. This transmission ratio is the ratio between the angular speed of the axle of the crankset and the angular speed of the secondary output plate. This gear ratio may, for example, be determined on the basis of a gear ratio parameter provided by the user of the pedal vehicle or determined by the control unit in order to provide an automatic gear change for the cyclist. In particular, this determination can be in particular calculated on the basis of a pedalling rate parameter defined by the user. The first motor is preferably controlled in terms of angular position or angular speed, for example via the control unit which controls the first motor in such a way that an instruction of angular position or angular speed is complied with.

Preferably, the second motor has the role of managing the correct level of assistance of the powertrain. One of its functions is to assist the motion of the cyclist by adding torque to the crankset. Preferably, the level of assistance is determined by the control unit based in particular on an assistance level parameter. The assistance level parameter can be determined by the user or automatically by the control unit of the powertrain. It is preferred that the level of assistance is independent of the gear ratio of the powertrain. The second motor is preferably controlled in terms of current or torque, for example via the control unit which controls the second motor in such a way that an instruction of current or torque is complied with.

Preferably, the control unit is electrically connected to the element for measuring an angular position of the first motor, to the element for measuring an angular position of the second motor, to the element for measuring a current of the first motor, and to the element for measuring a current of the second motor.

It is interesting to note that there is no fundamental difference between a position control and a speed control because there is a direct mathematical link between the two values. The angular speed is the time derivative of the angular position. For example, controlling a motor to rotate at a constant angular speed is equivalent to controlling a motor to follow an angular position that changes linearly with time.

The invention further provides a manufacturing method comprising an assembly of a propulsion system as described in the present document, and a method for using a propulsion system as described in the present document.

The invention further provides a pedal vehicle comprising a propulsion system according to any of the embodiments of the invention, a frame, and a rear wheel.

In an embodiment of the invention, the mechanical connection between the rear wheel and the powertrain passes through only one side of the rear wheel and comprises the propulsion system. In other words, the pedal vehicle is of the single-arm type. Indeed, one side of the rear wheel is free of any mechanical connection between the frame and the rear wheel axle.

In an embodiment of the invention, the pedal vehicle further comprises an element arranged to rotate with the rear wheel and to be detected by a rear sensor arranged to measure the speed of the rear wheel and located within the casing assembly.

BRIEF DESCRIPTION OF FIGURES

Further characteristics and advantages of the invention will become apparent from the following detailed description, for the understanding of which reference is made to the appended figures, among which.

EMBODIMENTS OF THE INVENTION

The present invention is described with particular embodiments and references to figures but the invention is not limited thereby. The drawings or figures described are only schematic and are not limiting. In the context of this present document, the terms "first" and "second" are used only to differentiate the various elements and do not imply an order between these elements. In the figures, the identical or similar elements may have the same references.

Figure 1:
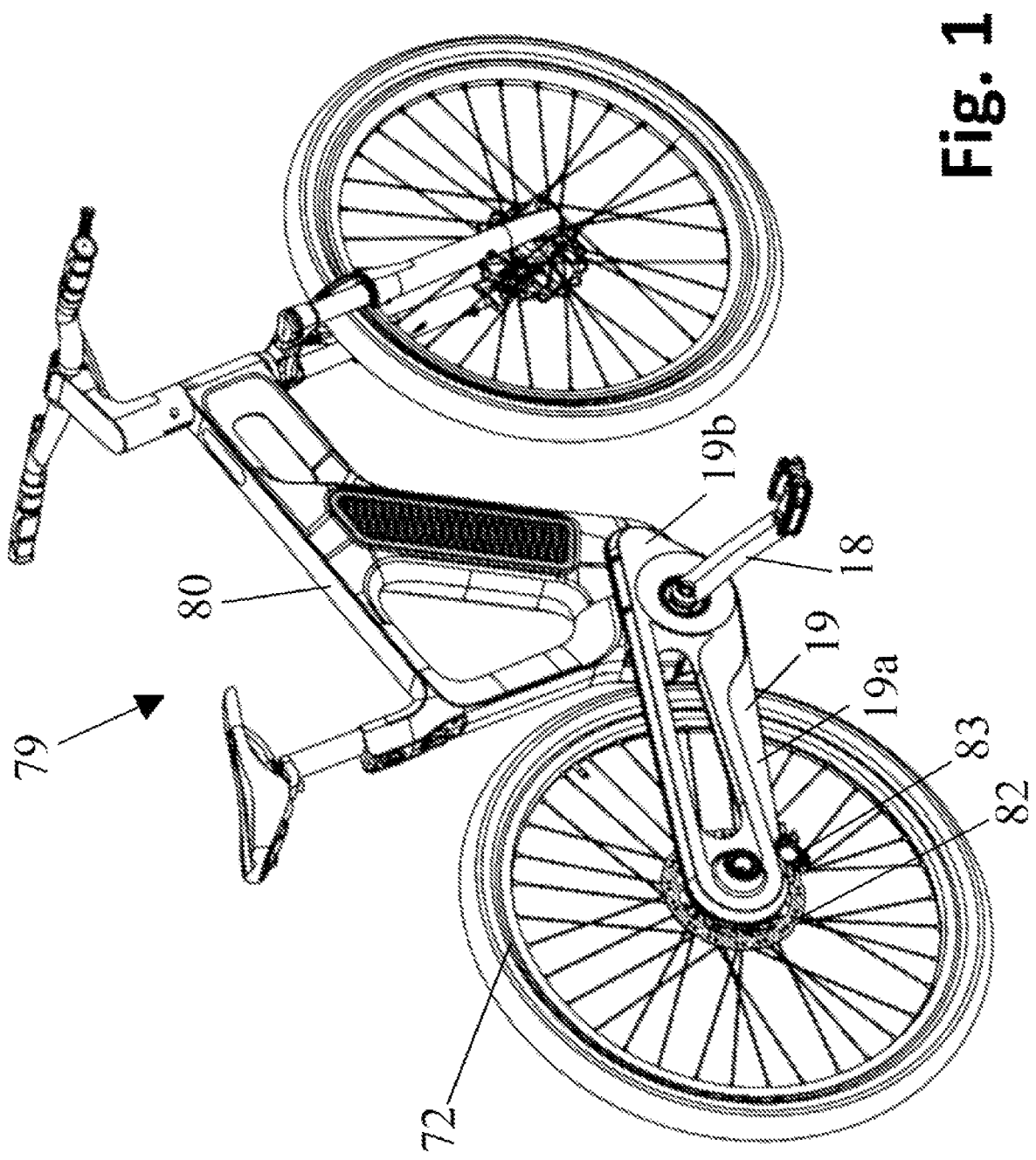
FIG. 1 illustrates a three-dimensional view of a vehicle equipped with a propulsion system in which the transmission casing forms a self-supporting single-arm.

FIG. 1 illustrates a three-dimensional view of a vehicle 79 equipped with a propulsion system according to an embodiment of the invention. The vehicle 79 comprises a frame 80, to which the propulsion system 1 is attached. The propulsion system 1 comprises a powertrain 1*a* and a first deformable transmission element 23 (shown in FIGS. 2 to 4) enclosed in a casing assembly 19. The casing assembly 19 preferably comprises a motor casing 19*b* and a transmission casing 19*a* (shown FIG. 5). In the illustrated embodiment, the transmission casing forms a single-arm. It is self-supporting and ensures the attachment of the rear wheel 72 to the frame 80. FIG. 1 also shows a crank 18, a brake disc 82 and a brake calliper 83

Figure 2:
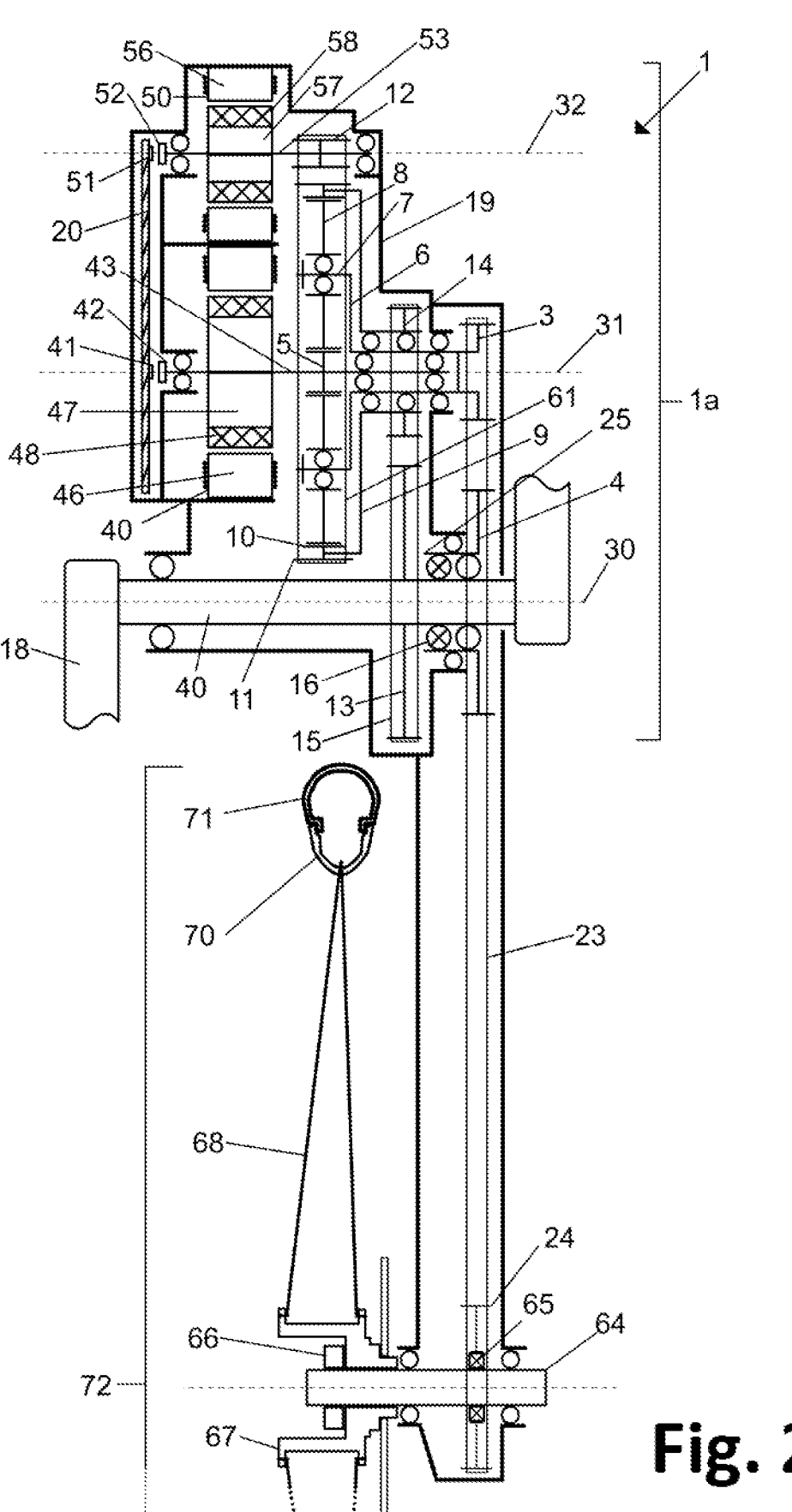
FIG. 2 illustrates a schematic section of a first variant of the first embodiment of the invention.

FIG. 2 illustrates a schematic cross-section of a first alternative of the first embodiment of the invention.

The powertrain 1*a* comprises a crankset axle 2 and a secondary output plate 4 with the same axis of rotation. This axis may be referred to as first axis of rotation 30. Preferably, the crankset axle 2 is attached to two cranks 18. Preferably, the powertrain 1*a* comprises a casing assembly 19, forming an envelope surrounding the first deformable transmission element 23 and the powertrain 1*a*, except for the ends of the crankset axle 2. The first deformable transmission element 23 provides torque transmission from the first 3 and/or the second output plate 4 to the rear wheel 24 sprocket.

The powertrain 1*a* comprises a main output plate 3 attached to the planet carrier 6, preferably at one end of the planet carrier 6, so as to rotate with the planet carrier 6.

The powertrain 1*a* also comprises a secondary output plate 4, attached to a hollow secondary output shaft 25 passing through the side wall of the casing assembly 19. The hollow secondary output shaft 25 is mounted on a bearing around the crankset axle 2. A first freewheel 16 is installed between the crankset axle 2 and the hollow secondary output shaft 25 so that the secondary output plate 4 cannot rotate slower than the crankset axle 2 when the crankset axle 2 is operated in the normal pedalling direction.

The powertrain 1*a* comprises a first motor 40 and a second motor 50. The first motor 40 comprises a stator 46 and a rotor 47 which preferably comprises magnets 48. The rotor 47 is arranged to rotate about a second axis of rotation 31. The torque of the rotor 47 is transmitted through the shaft 43 of the rotor to a sun 5. The second motor 50 comprises a stator 56 and a rotor 57 which preferably comprises magnets 58. The rotor 57 is arranged to rotate about a third axis of rotation 32. The torque from the rotor 57 is transmitted through the shaft 53 of the rotor to a third pulley 12.

A function of the first freewheel 16 is to allow a purely mechanical power transmission from the crankset axle 2 to the first deformable transmission element 23, even when the motors 40, 50 are not powered. In the locked position, the freewheel 16 makes the crankset axle 2 integral with the secondary output plate 4. In the free position, the output plate 4 is free to rotate faster than the crankset axle 2 when the crankset axle 2 is operated in the normal pedalling direction.

The powertrain 1*a* preferably comprises a current measuring element of the first motor 40 and a current measuring element of the second motor 50. The powertrain 1*a* further preferably comprises a control unit, preferably attached to a printed circuit board 20. The circuit board 20 is preferably located perpendicular to the second 31 and the third 32 axis of rotation.

Preferably, a first measuring magnet 42 is attached to an end of a shaft 43 of the first motor 40 and a second measuring magnet 52 is attached to an end of a shaft 53 of the second motor 50. Preferably, a first sensor 41 is attached to the printed circuit board 20, approximately in line with the second axis of rotation 31. The first sensor 41 and the first measuring magnet 42 are part of an angular position measuring element of the rotor 47 of the first motor 40. Preferably, a second sensor 51 is attached to the printed circuit board 20 approximately in line with the third axis of rotation 32. The second sensor 51 and the second measuring magnet 52 are part of an angular position measuring element of the rotor 57 of the second motor 50.

The control unit controls the first motor 40 and the second motor 50 on the basis of the angular position of the first motor 40, of the angular position of the second motor 50, of the current of the first motor 40 and of the current of the second motor 50, this information having been supplied to it by the measuring elements. The control unit controls the second motor 50 in current or in torque. The control unit controls the first motor 40 in angular position or in angular speed.

The powertrain 1*a* comprises an epicyclic gear train which comprises a first input element, an output element and the sun 5.

The powertrain 1*a* further comprises a second deformable transmission element 15, for example a chain or a belt, allowing to transmit a rotation between the crankset axle 2 and the first input element. This second deformable transmission element 15 forms a speed reduction system maintaining the direction of rotation.

Figure 3:
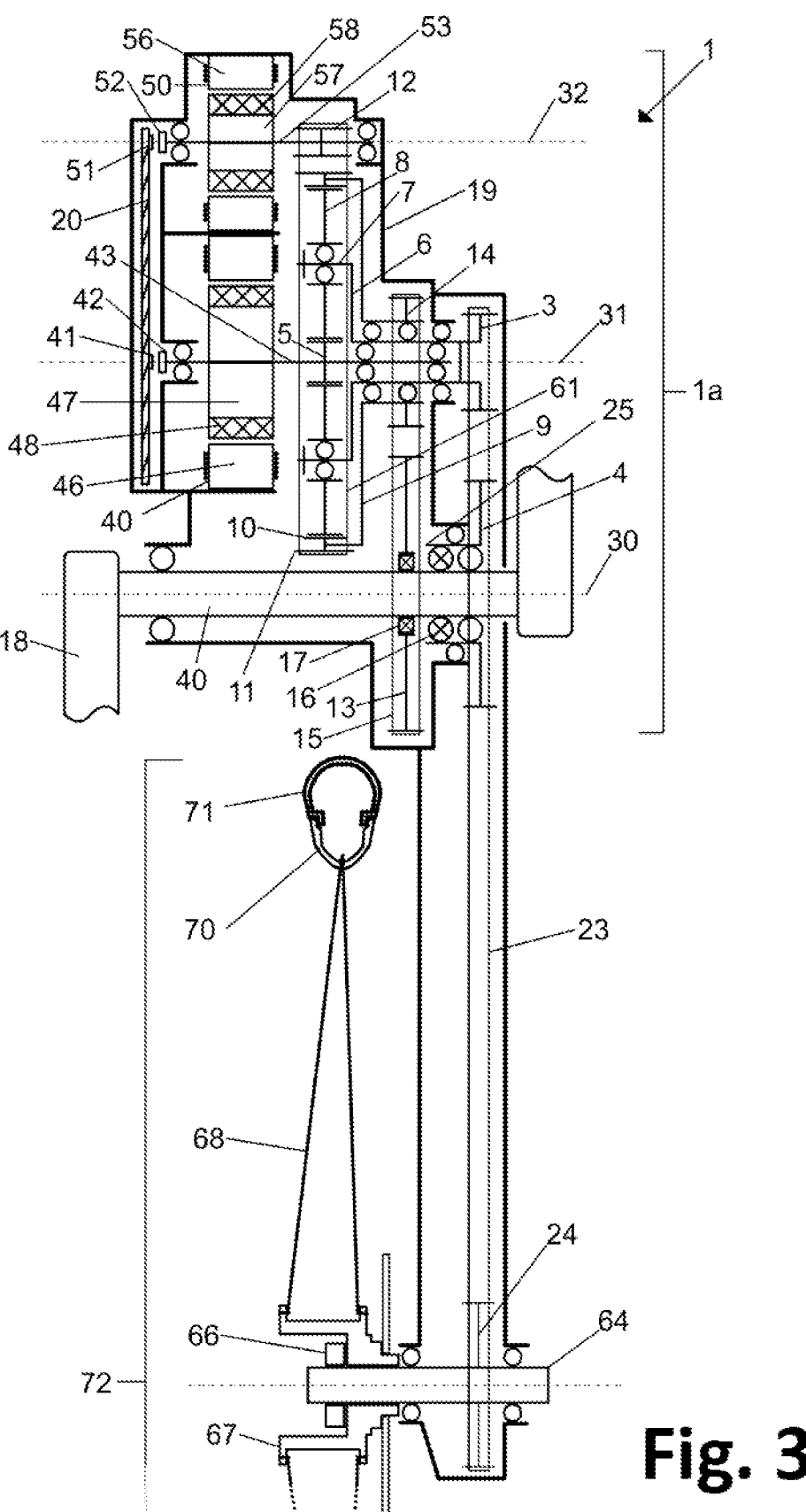
FIG. 3 illustrates a schematic section of a second variant of the first embodiment of the invention.

In the first embodiment of the invention, which is that illustrated in FIGS. 2 and 3, the first input element is a ring gear 9 and the output element is a planet carrier 6. Preferably, the planet carrier 6 comprises at least one planet gear 8 arranged to rotate about a planet gear axle 7. Preferably, the ring gear 9 is meshed to at least one planet gear 8 via its internal toothing 10. Preferably, the sun 5 is meshed to the at least one planet gear 8.

In an embodiment of the invention, a first pulley 13 is integral with the crankset axle 2. The first pulley 13 is connected to a second pulley 14 by the second deformable transmission element 15. The second pulley 14 is integral with the ring gear 9. Preferably, the first pulley 13 has a larger diameter than the second pulley 14 in order to increase the speed of rotation relative to that of the crankset axle 2. For example, the diameter of the first pulley 13 may be between 1.5 and 3 times larger than that of the second pulley 14.

In the normal operating mode, the powertrain 1*a* according to the first embodiment of the invention operates as follows. The crankset axle 2 and the second motor 50 drive the ring gear 9, the drive between the crankset axle 2 and the ring gear 9 passing through the second deformable transmission element 15. The ring gear 9 is a first input of the epicyclic gear train. The first motor 40 drives the sun 5, which is a second input of the epicyclic gear train. The ring gear 9 and the sun 5 drive the planet carrier 6, which is an output of the epicyclic gear train. The planet carrier 6 drives the main output plate 3. The rotational speed of the main output plate will be equal to a weighted sum of the rotational speed of the ring gear 9 and of the rotational speed of the sun 5. By increasing the rotational speed of the sun 5, it is therefore possible to increase the speed of the main output plate 3, while keeping a constant rotational speed at the level of the crankset axle 2. It is therefore a continuously variable transmission (CVT).

The propulsion system 1 further comprises a third deformable transmission element 61, for example a chain or a belt, allowing to transmit a rotation between the third pulley 12, which is integral with the rotor 57 of the second motor 50, and an external toothing 11 of the ring gear 9. This third deformable transmission element 61 forms a speed reduction system maintaining the direction of rotation. The third pulley 12 has a smaller diameter than that of the ring gear 9, the aim being to reduce the speed of rotation in relation to that of the motor.

The sun 5 is integral with the rotor 47 of the first motor 40 so as to rotate with this rotor 47. The planet carrier 6 is integral with the main output plate 3.

The first deformable transmission element 23 is housed in the transmission casing 19*a*. The output power of the powertrain 1*a* is transmitted via the first deformable transmission element 23 to a rear sprocket 24. The rear sprocket 24 transmits the torque to a rear wheel axle 64 by means of a rear wheel freewheel 65. This freewheel 65 is positioned so that the rear sprocket 24 cannot rotate faster than the rear wheel 72 when the crankset axle 2 rotates in the normal pedalling direction. It is arranged to transmit the torque from the rear wheel sprocket to the rear wheel when the crankset is operated in its normal direction. The purpose of this freewheel 24 is to allow the cyclist to move forward without pedalling, for example when going downhill. A hub 67 of the rear wheel 72 is integrally attached to the rear wheel axle 64 by a nut 66. The hub 67 transmits the torque to the rear tire 71 via the spokes 68 and the rim 70.

The first freewheel 16 prevents the secondary output plate 4 from rotating slower than the crankset axle 2 when the crankset axle 2 rotates in the normal pedalling direction. The purpose of this freewheel 16 is that the gear ratio of the powertrain 1*a* cannot be less than 1:1.

FIG. 3 illustrates an alternative embodiment of the powertrain 1*a* in which a second freewheel 17 is installed between the crankset axle 2 and the first pulley 13. This freewheel 17 has the function of preventing the second motor 50 from driving the crankset axle 2 when the crankset axle 2 is operated in the normal pedalling direction.

The second freewheel 17 drives the first pulley 13 when the crankset axle 2 is operated in the normal pedalling direction, but the first pulley 13 cannot drive the crankset axle 2 when the crankset axle 2 is operated in the normal pedalling direction.

The embodiment shown in FIG. 3 illustrates a rear wheel assembly that does not contain a rear wheel freewheel 65. In this embodiment, the rear wheel sprocket 24 is integrally mounted to the rear wheel axle 64. In particular, this allows the powertrain 1*a* to be used to brake the vehicle 79. Indeed, the kinetic energy may be transmitted from the rear wheel 72 to the main output plate 3, so as to drive the first motor 40 and/or the second motor 50. The motor or the motors are thus driven in brake to recharge the battery. This motor brake can be activated, for example, by a manual control on the handlebar, or by back-pedalling. It is interesting to note that the driving of the rear wheel will not rotate the crankset during the motor brake, thanks to the presence of the second freewheel 17.

Figure 4:
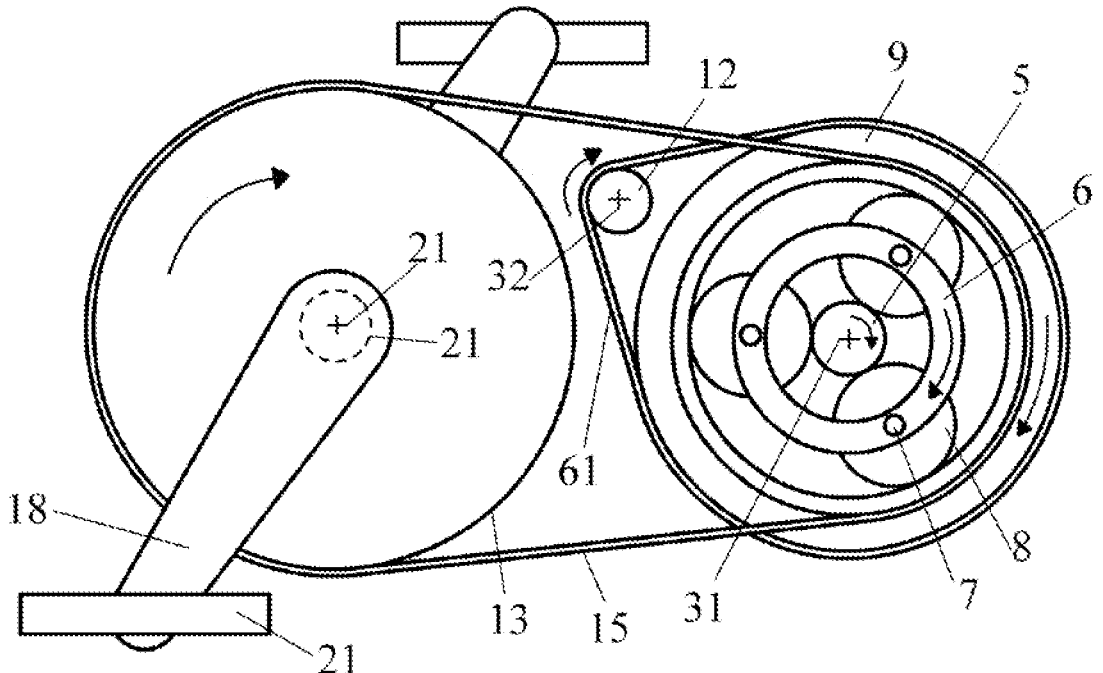
FIG. 4 illustrates very schematically an internal kinematic chain of a powertrain according to an embodiment of the invention.

FIG. 4 illustrates very schematically an internal kinematic chain of a powertrain 1a according to an embodiment of the invention. According to this kinematic chain, the cyclist provides power to the input of the system via pedals 21, driving the crankset axle 2 via the cranks 18. The first pulley 13, which is integral with the crankset axle 2, drives via the second deformable transmission element 15, the ring gear 9, so that the latter rotates faster than the crankset axle 2. The third pulley 12, which is integral with the rotor 57 of the second motor (not shown in this simplified diagram), drives the external toothing 11 of the ring gear 9, via a third deformable transmission element 61, so that the latter rotates slower than the third pulley 12. The ring gear 9 is the first input of the epicyclic gear train. The sun 5, integral with the rotor 47 of the first motor (not shown in this simplified diagram), constitutes the second input of the epicyclic gear train. The sun 5 and the ring gear 9 are connected together via the planet carrier 6 comprising at least one planet gear 8. The planet gear or the planet gears 8 are held in a freely rotatable manner by axles 7 of the planet carrier 6. The planet carrier 6 is the output of the epicyclic gear train.

The arrows in FIG. 4 show the direction of rotation of the various members in normal operation of the powertrain 1a. In the interest of simplification and visibility of the diagram shown in FIG. 4, the various transmission members (wheel, sprocket, belt) appear smooth and may suggest a friction transmission. This does not, of course, preclude the use of toothings to make toothed wheels or serrated belts.

Figure 5:
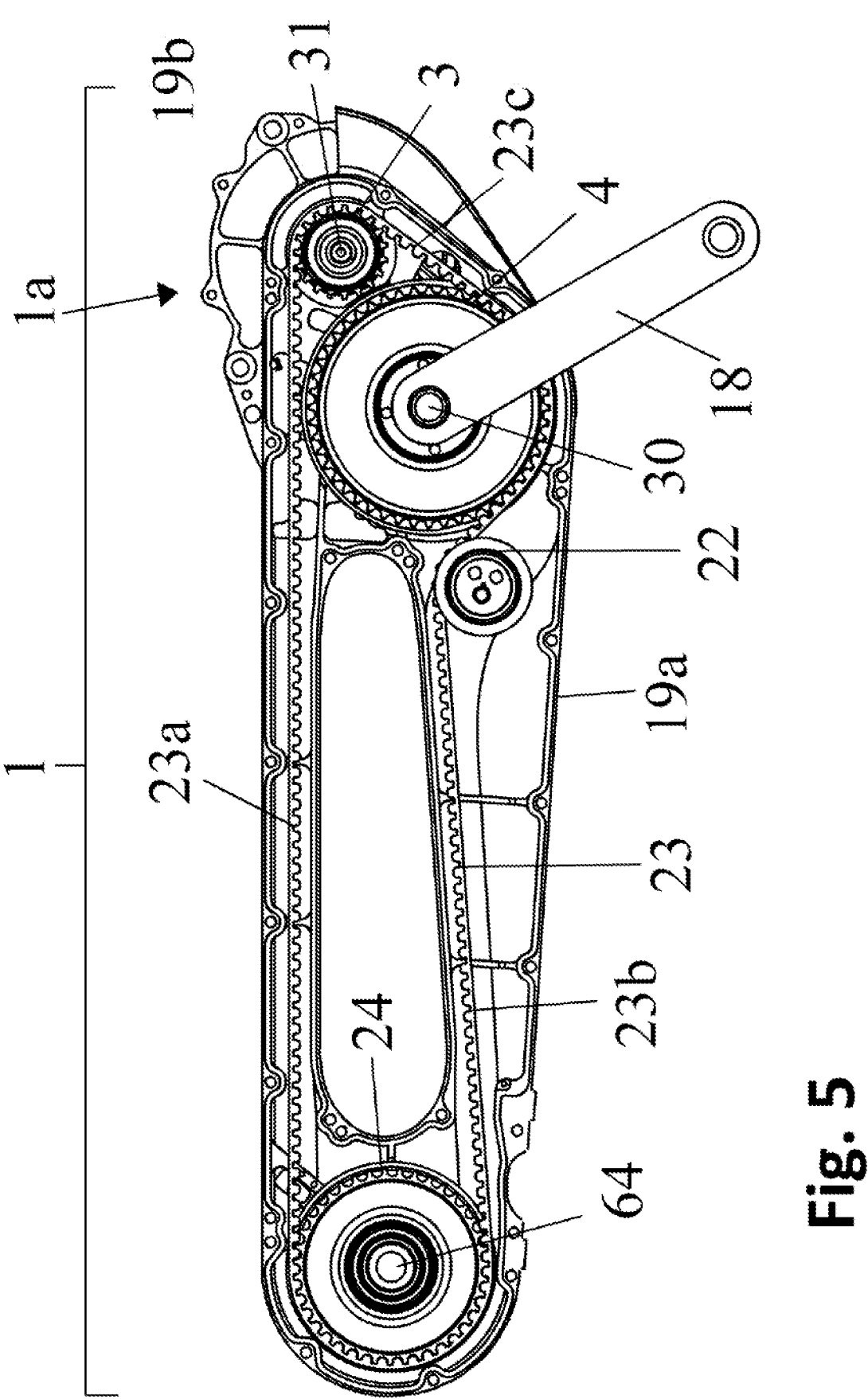
FIG. 5 illustrates a side view of the transmission system integrated in a transmission casing according to an embodiment of the invention.

FIG. 5 illustrates a side view of the propulsion system 1 according to an embodiment of the invention. In this view, the cover of the transmission casing 19a has been deliberately hidden to reveal the internal transmission.

FIG. 5 illustrates a powertrain 1a, a first deformable transmission element 23, a rear wheel sprocket 24 and a tensioning roller 22. The first deformable transmission element 23 comprises an upper strand 23a, a lower strand 23b and an intermediate strand 23c. The intermediate strand 23c is the portion of the first deformable transmission element 23 located between the main output plate 3 and the secondary output plate 4.

The role of the tensioning roller 22 is to apply the right level of pre-tension in the first deformable transmission element 23, so that the latter is not too relaxed, once put under high load. The tensioning roller 22 may be fixedly mounted or mounted by means of a spring (not shown in FIG. 5) in order to take up the slack in the first deformable transmission element 23 when the transmission is loaded. It allows the intermediate strand 23c to remain tense. This tensioning roller 22 may be integrated into the casing assembly 19 of the powertrain 1a. It is placed so as to be in contact with the lower strand 23b. It is also possible to envisage a stationary operation without a tensioning roller 22.

In the normal operating mode of the powertrain 1a, the main output plate 3 drives the first deformable transmission element 23. The secondary output plate 4, being preferably meshed to the same first deformable transmission element 23 as the main output plate 3, rotates at no load at a higher speed than the crankset axle 2. The secondary output plate 4 is disengaged from the crankset axle 2 by means of the first freewheel 16.

In particular operating modes, different from the normal mode of operation of the powertrain 1a, the first freewheel 16 locks and prevents the secondary output plate 4 from rotating slower than the axle 2 of the crankset. In this case, the secondary output plate 4 drives, in whole or in part, the first deformable transmission element 23, and thus also the main output plate 3. If the electrical system is de-energized and/or if the assistance is deactivated and the lowest gear ratio of the powertrain 1a is selected (either by the user or by the control system), then all of the power of the cyclist is transmitted to the first deformable transmission element 23 via the secondary output plate 4. The rest of the transmission is therefore not loaded and the transmission is mechanically highly efficient.

Preferably, the main output plate 3 is smaller than the secondary output plate 4. Preferably, the rear sprocket 24 is smaller than the secondary output plate 4 and larger than the main output plate 3.

It is interesting to note that the arrangement of the powertrain 1a according to the invention is compatible with the powertrain variants described in the document WO2013/160477 or in the document WO2016/034574 or with other known powertrain variants.

In other words, the invention relates to a propulsion system 1 for a pedal vehicle. The propulsion system 1 comprises a powertrain 1a allowing to combine power from a crankset axle 2 and from two motors 40, 50, a first deformable transmission element 23 allowing to transmit power to the rear wheel 73 and a casing assembly 19 enclosing in particular the first deformable transmission element 23 and the powertrain 1a, with the exception of a portion of the crankset axle.

The present invention has been described above in relation with specific embodiments, which are purely illustrative and should not be considered limiting. In a general manner, the present invention is not limited to the examples illustrated and/or described above. The use of the verbs "comprise", "include", or any other variant, as well as their conjugations, can in no way exclude the presence of elements other than those mentioned. The use of the indefinite article "a", "an", or the definite article "the", to introduce an element does not exclude the presence of a plurality of these elements. The reference numbers in the claims do not limit their scope.

The invention claimed is:

1. A propulsion system for a pedal vehicle and comprising:

a first deformable transmission element arranged to drive a rear wheel of the pedal vehicle;

a powertrain comprising:

a crankset axle arranged to rotate about a first axis of rotation, a main output plate arranged to drive the first deformable transmission element, a first motor, a second motor, an epicyclic gear train comprising a first input element, an output element and a sun, the crankset axle and the second motor being connected to the epicyclic gear train via the first input element so as to form a first input of the epicyclic gear train, the first motor being connected to the epicyclic gear train via the sun so as to form a second input of the epicyclic gear train, the output element connecting the epicyclic gear train to the main output plate so as to form an output of the epicyclic gear train, and the first deformable transmission element being arranged to transmit power between the powertrain and the rear wheel of the pedal vehicle; and a casing assembly;

a rear sprocket;

wherein the main output plate, the first input element, the output element and the sun are arranged so as to rotate about a same second axis of rotation different from the first axis of rotation;

the powertrain comprises:

a secondary output plate arranged to rotate about the first axis of rotation and meshed to the first deformable transmission element, a speed reduction system maintaining the direction of rotation for transmitting a rotation between the crankset axle and the first input element; and the first deformable transmission element, a portion of the crankset axle, the main output plate, the first motor, the second motor, the epicyclic gear train, the secondary output plate, and the rear sprocket are within the casing assembly.

2. The propulsion system according to claim 1, further comprising a tensioning roller arranged to tension the first deformable transmission element.

3. The propulsion system according to claim 1, wherein the casing assembly comprises a transmission casing which encloses the first deformable transmission element, the transmission casing being arranged to be located on one side only of the rear wheel.

4. The propulsion system according to claim 1, wherein the casing assembly is arranged to ensure alone the mechanical attachment between the rear wheel and a frame of the pedal vehicle.

5. The propulsion system according to claim 1, wherein the second motor is connected to the first input element of the epicyclic gear train via a third deformable transmission element.

6. The propulsion system according to claim 1, further comprising a rear sensor arranged to measure the speed of the rear wheel and located within the casing assembly.

7. The propulsion system according to claim 1, wherein the main output plate is integral with the output element.

8. The propulsion system according to claim 1, further comprising a first freewheel arranged to prevent the secondary output plate from rotating slower than the crankset axle when the crankset axle rotates in the normal pedalling direction.

9. The propulsion system according to claim 1, wherein the powertrain further comprises a second freewheel arranged to prevent a drive of the crankset axle by the second motor in a rotational direction corresponding to a forward motion of the pedal vehicle.

10. The propulsion system according to claim 1, wherein the powertrain further comprises a rear wheel freewheel arranged to prevent the rear sprocket from rotating faster than the rear wheel when the crankset axle rotates in the normal pedalling direction which corresponds to a forward motion of the pedal vehicle.

11. The propulsion system according to claim 1, wherein the main output plate is smaller than the secondary output plate.

12. The propulsion system according to claim 11, wherein the rear sprocket is smaller than the secondary output plate and larger than the main output plate.

13. The propulsion system according to claim 1, wherein the first input element is a ring gear of the epicyclic gear train and the output element is a planet carrier of the epicyclic gear train.

14. The propulsion system according to claim 1, wherein the first input element is a planet carrier of the epicyclic gear train and the output element is a ring gear of the epicyclic gear train.

15. The propulsion system according to claim 1, wherein the first motor is integral with the sun.

16. The propulsion system according to claim 1, wherein the crankset axle and the first input element are connected such that the first input element rotates faster than the crankset axle.

17. A pedal vehicle comprising a propulsion system according to claim 1, a frame, and a rear wheel.

18. The pedal vehicle according to claim 17, wherein the mechanical connection between the rear wheel and the powertrain passes through only one side of the rear wheel and comprises the propulsion system.

* * * * *